US006940786B2

(12) United States Patent
Yanagisawa

(10) Patent No.: US 6,940,786 B2
(45) Date of Patent: Sep. 6, 2005

(54) ELECTRONIC TIMEPIECE WITH STABLE IC MOUNTING

(75) Inventor: Toshiaki Yanagisawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 342 days.

(21) Appl. No.: 10/397,815

(22) Filed: Mar. 26, 2003

(65) Prior Publication Data

US 2003/0198142 A1 Oct. 23, 2003

(30) Foreign Application Priority Data

Mar. 27, 2002 (JP) .................................... 2002-089633

(51) Int. Cl.[7] ............................................ G06F 1/16

(52) U.S. Cl. ................................... 368/157; 368/160

(58) Field of Search ............................ 368/157, 160, 368/80, 85, 204

(56) References Cited

U.S. PATENT DOCUMENTS

| | | | | |
|---|---|---|---|---|
| 4,186,551 A | * | 2/1980 | Nakayama | 368/88 |
| 4,266,290 A | * | 5/1981 | Futami et al. | 368/76 |
| 4,351,040 A | * | 9/1982 | Aoki | 368/88 |
| 4,794,576 A | * | 12/1988 | Schwartz et al. | 368/185 |
| 6,400,651 B1 | * | 6/2002 | Watanabe et al. | 368/155 |

FOREIGN PATENT DOCUMENTS

| | | |
|---|---|---|
| JP | 63-135889 | 6/1988 |
| JP | 63-122289 | 8/1988 |
| JP | 6-19111 | 5/1994 |
| JP | 2946204 | 7/1999 |

* cited by examiner

*Primary Examiner*—Kamand Cuneo
*Assistant Examiner*—Jeanne-Marguerite Goodwin
(74) *Attorney, Agent, or Firm*—Mark P. Watson

(57) ABSTRACT

An electronic timepiece that maintains the mounting integrity of an electronic circuit substrate and an electronic circuit component mounted on the electronic circuit substrate. In a movement 1 including a main plate 2 composed of an electric insulting material, a stepping motor 10, a wheel train 4, and a wheel train bridge for supporting the wheel train 4, an electronic circuit substrate 20, on which an electronic circuit component 22 for controlling the rotation cycle of the stepping motor 10 is mounted, is attached to an end portion of an coil magnetic core 12 of the stepping motor 10, and the relatively large electronic circuit component 22 is positioned by being superimposed on the coil magnetic core 12 in a plane. Accordingly, the electronic circuit substrate 20 formed of a synthetic resin film and the like can be reliably attached to the coil magnetic core 12, and the mounting integrity the electronic circuit component 22 can be maintained.

13 Claims, 4 Drawing Sheets

ELECTRONIC TIMEPIECE WITH STABLE IC MOUNTING

BACKGROUND OF THE INVENTION

1. Field of the Invention

The present invention relates to an electronic timepiece, and more particularly, to the improvement of layout of a stepping motor and an electronic circuit.

2. Description of the Related Art

There has been known an electronic timepiece arranged such that a stepping motor is driven by a battery as a drive source, the drive of the stepping motor is controlled by an electronic circuit for creating a reference frequency signal based on a clock signal from a quartz oscillator to thereby precisely move hands secured to a wheel train.

In this electronic timepiece, ordinarily, an electronic circuit substrate formed of a synthetic resin film and the like is attached to an end of a coil magnetic core constituting the stepping motor. Since the electronic circuit substrate is larger than the end of the coil magnetic core, it protrudes from the coil magnetic core when viewed in a plane. The protruding portion of the electronic circuit substrate has a punched portion of a pace accelerating/decelerating line pattern connected to a negative conductive section of a power supply and is supported by a main plate and the like. Further, in the stepping motor and the electronic circuit substrate, first, the electronic circuit substrate is bonded to the coil magnetic core, next a coil wire is wound around the coil magnetic core, subsequently the coil wire is connected to an electronic circuit, and finally the assembly of the coil magnetic core and the electronic circuit substrate are assembled to the main plate.

In the stepping motor of the electronic timepiece, the electronic circuit substrate bonded such that it protrudes from the coil magnetic core is supported only by the bonded portion thereof in a cantilever state before it is assembled to the main plate. Therefore, the electronic circuit substrate is unstable in a coil winding process and in a process for assembling it to the main plate. So, a problem arises in that it is difficult to ensure reliable manufacture in that the electronic circuit substrate is liable to be dropped and a bonded surface is liable to be partly detached.

In particular, when an electronic circuit component such as a large IC chip is mounted on the portion of the electronic circuit substrate protruding from the coil magnetic core, a problem arises in that the electronic circuit substrate may be bent and deformed in a coil winding process and in an assembly process and is more liable to become detached from the coil magnetic core, and the portion on which the IC chip is mounted is also liable to become detached.

Further, when the pace accelerating/decelerating unit is cut by a laser beam after assembly of the movement, since the main plate and other components are formed in the linearly traveling direction of the laser beam, something must be provided to prevent these components from being damaged by the laser beam.

Further, when negative conduction provided by a spring member, for example, is positioned on the circuit substrate, stress is applied to a portion different from the bonded portion of the circuit substrate, and thus the bonded portion may become detached.

OBJECTS OF THE INVENTION

An object of the present invention is to provide an electronic timepiece that maintains the mounting integrity of an electronic circuit substrate and an electronic circuit component mounted on the electronic circuit substrate

SUMMARY OF THE INVENTION

An electronic timepiece of the present invention, which comprises a main plate composed of an electric insulating material, a stepping motor having a stator, a coil magnetic core, a motor coil, and a rotor, a power supply, a wheel train driven by the stepping motor, a wheel train bridge for supporting the wheel train, a quartz oscillator for outputting a clock signal, an electronic circuit substrate on which an electronic circuit component for controlling the rotation cycle of the stepping motor based on the clock signal is mounted, with the electronic circuit component in a position superimposed on the coil magnetic core in a plane.

In the present invention arranged as described above, the relatively large electronic circuit component mounted on the electronic circuit substrate, formed of a synthetic resin film or ceramic film and the like, is positioned by being directly superimposed on the upper surface of the metal coil magnetic core that is relatively thick and unlikely to be deformed. Accordingly, a load in a cantilever state acting on the electronic circuit substrate is reduced, thereby the electronic circuit substrate can be reliably mounted on the coil magnetic core and the mounted portion of the electronic circuit component is supported on the surface of the coil magnetic core. As a result, the electronic circuit substrate is not deformed, and the mounted state of the electronic circuit component mounted on the electronic circuit substrate can be stabilized, in addition to the mounted state of the electronic circuit substrate itself.

In the above electronic timepiece, it is preferable that a pace accelerating/decelerating unit for adjusting a pace accuracy be mounted on the electronic circuit substrate in a position superimposed on the coil magnetic core in a plane.

In a conventional electronic timepiece in which an electronic circuit substrate is supported by a main plate, a pace accelerating/decelerating unit for adjusting a pace accuracy is ordinarily positioned at a position on the electronic circuit substrate that is not superimposed on a coil magnetic core in a plane.

The pace accelerating/decelerating unit is arranged such that a plurality of line patterns of a pattern formed of a copper foil and the like on a substrate are positioned approximately in parallel with each other at intervals across a slot defined through the substrate. One or a plurality of line patterns selected from these line patterns are cut off by a laser beam and the like to correct the variance of a clock signal oscillated by a quartz oscillator so that a reference frequency signal supplied to a stepping motor can be appropriately controlled.

However, when the line patterns are cut off by the laser beam in the conventional electronic timepiece, the laser beam irradiated from the side of the electronic circuit substrate opposite to a main plate, passes through the pace accelerating/decelerating unit and damages components positioned on a side nearer to the main plate than the electronic circuit substrate and even the main plate. Thus, a member for preventing the laser beam from impinging on the components other than the line patterns must be positioned below the pace accelerating/decelerating unit (for example, the shield member 20*a* of Pat. No. 2,946,204). Therefore, the number of components and assembly processes is increased, which increases the manufacturing cost of the electronic timepiece.

Thus, according to the arrangement of the present invention, since the pace accelerating/decelerating unit is positioned by being superimposed on the coil magnetic core in a plane, the laser beam having cut off the line patterns of the pace accelerating/decelerating unit is shielded by the coil magnetic core and does not impinge on the components other than the coil magnetic core, thereby the cost can be reduced by eliminating the necessity of separately providing a laser beam shield member and by decreasing the number of components. Since the coil magnetic core is the relatively thick metal member, even if it is somewhat damaged by the laser beam, it does not influence the drive of the stepping motor at all. That is, even if the coil magnetic core is somewhat damaged and generates magnetostriction, it does not influence the drive of the stepping motor as long as it is damaged in a region where the flow of the magnetic flux of the stepping motor is not influenced.

In the above electronic timepiece, it is preferable that the electronic timepiece comprise a positive terminal for electrically conducting a positive pole of the power supply to an electric circuit of the electronic circuit substrate and a negative terminal in contact with a negative pole of the power supply and that the negative pole of the power supply be electrically conducted to the electronic circuit through the negative terminal and the coil magnetic core.

In the above arrangement, since the. electric conduction from the electronic circuit substrate to the electronic circuit can be executed from both the positive and negative poles of the power supply for driving the stepping motor, the power supply and the electronic circuit substrate can be separately positioned on both sides of the motor. Thus, the effective planar layout of respective components can be achieved to realize miniaturization as well as the negative pole is conducted to the electronic circuit through the coil magnetic core. As a result, the assembly process can be simplified because the negative terminal need not be extended to the electronic circuit, the number of components can be reduced, and the negative terminal can be miniaturized.

In the above electronic timepiece, it is preferable that the electronic circuit comprise a negative conductive section conducted to the coil magnetic core and that the negative conductive section be pressed against the coil magnetic core by a presser member.

In the above arrangement, since the negative conductive section positioned to the electronic circuit is pressed against the coil magnetic core by the presser member, the negative pole of the power supply can be reliably conducted up to the electronic circuit through the coil magnetic core without a problem of poor contact and the like.

In the above electronic timepiece, it is preferable that the presser member be a presser section of the wheel train bridge.

In the above arrangement, since the negative conductive section of the electronic circuit is pressed by the presser section positioned as part of the wheel train bridge, the cost can be reduced through component sharing without the need of separately preparing a presser member.

In the above electronic timepiece, it is preferable that the electronic timepiece comprise a spring member for pressing the negative conductive section against the coil magnetic core through the presser member.

In the above arrangement, since the negative conductive section of the electronic circuit is pressed against the coil magnetic core by the presser member and further pressed against it by the spring member through the presser member, the negative pole of the power supply can be more reliably electrically conducted to the electronic circuit, thereby the stepping motor can be driven stably.

That is, when a single presser spring member is provided, if the frequency of vibration of a mechanical impact applied from the outside of the timepiece coincides with the natural frequency of the presser spring member, a resonant state is caused and chattering arises due to the unstable securing force of the negative conductive section of the electronic circuit. Thus, power may not be stably supplied to the stepping motor. In the present invention, since the structure, in which the negative conductive section is doubly pressed against the coil magnetic core, is employed, even if the resonant state is caused, the occurrence of chattering can be suppressed because the negative conductive section of the electronic circuit is pressed by another spring, which permits the power to be stably supplied to the stepping motor.

In the above electronic timepiece, it is preferable that the spring member be a presser spring section positioned as part of the positive terminal and that the presser member have an electric insulation property.

In the above arrangement, since the negative conductive section of the electronic circuit is pressed by the presser spring section positioned to be part of the positive terminal, a spring member need not be separately provided, thereby the assembly process can be simplified because the negative conductive section can be pressed simultaneously with the attachment of the positive terminal.

Further, since the presser member has an electrical insulation property, the positive terminal is not short-circuited with the negative conductive section, and the negative conduction to the electronic circuit can be stabilized.

In the above electronic timepiece, it is preferable that the stator and the coil magnetic core are superimposed on each other and are clamped between the negative terminal and a clamp member, the negative terminal pressing and coming into contact with one of the stator and the coil magnetic core from a first direction, and the clamp member pressing and holding the other of the stator and the coil magnetic core from a second direction opposite from the first direction.

In the above arrangement, since the negative terminal presses the stator coil or the coil magnetic core, the negative pole of the battery can be reliably electrically conducted to the stator or to the coil magnetic core. Further, the intimate contact force between the stator and the coil magnetic core can be increased by clamping them between the negative terminal and the clamp member, thereby the electric conduction of the negative pole to the coil magnetic core and the magnetic conduction between the coil magnetic core and the stator can be reliably achieved.

In the above electronic timepiece, it is preferable that a projection projecting toward the stator or toward the coil magnetic core be positioned where the negative terminal presses the stator or the coil magnetic core.

In the above arrangement, the negative terminal presses the stator or the coil magnetic core by a point contact through the projection thereof, thereby increasing contact pressure. Accordingly, the stator can be caused to come into more intimate contact with the coil magnetic core, thereby the electric conduction of the negative pole to the coil magnetic core and the magnetic conduction between the coil magnetic core and the stator can be more reliably achieved.

In the above electronic timepiece, it is preferable that the clamp member be a clamp spring section positioned as a portion of the positive terminal and that an insulating member having an electric insulting property be interposed between the clamp spring section and the coil magnetic core.

In the above arrangement, the stator can be caused to come into intimate contact with the coil magnetic core by clamping the stator and the coil magnetic core by the clamp spring section positioned as part of the positive terminal and the negative terminal. Thus, the assembly process can be simplified because the stator and the coil magnetic core can be clamped simultaneously with the attachment of the positive terminal without the need to provide a separate clamp member. Further, the electric conduction between the positive pole and the negative pole can be appropriately executed without a short-circuit therebetween because the insulation member having the electrical insulation property is interposed between the clamp spring section of the positive terminal and the coil magnetic core or the stator.

In the above electronic timepiece, it is preferable that the insulation member be a part of the synthetic resin wheel train bridge.

In the above arrangement, an insulation member need not be prepared separately because insulation between the positive terminal and the coil magnetic core is provided by the part of the synthetic resin wheel train bridge. Thus, the cost can be reduced by a decrease in the number of components and by the simplification of the assembly process.

In the above electronic timepiece, it is preferable that the electronic circuit component be covered with a metal member on the side thereof opposite to the coil magnetic core.

In the above arrangement, the electronic circuit component, which is liable to be affected by electromagnetic noise from the outside, is clamped between the metal coil magnetic core and the metal member and covered therewith to shield electromagnetic noise, static electricity, and light rays (e.g. ultraviolet ray) invading from the outside of the electronic timepiece so that the electronic circuit components is not influenced thereby. Thus, the stepping motor can be driven stably.

In the electronic timepiece, it is preferable that the metal member be the positive terminal for electrically conducting the positive pole of the power supply to the electronic circuit of the electronic circuit substrate.

In the above arrangement, the electronic circuit component clamped between the metal coil magnetic core and the metal member and covered therewith similarly to the above arrangement. Thus, the stepping motor can be driven stably, and no metal member need be separately prepared. As a result, the cost can be reduced by a decrease in the number of components and the simplification of the assembly process.

DESCRIPTION OF THE PREFERRED EMBODIMENTS

An embodiment of the present invention will be described below with reference to the drawings.

Figure 1:
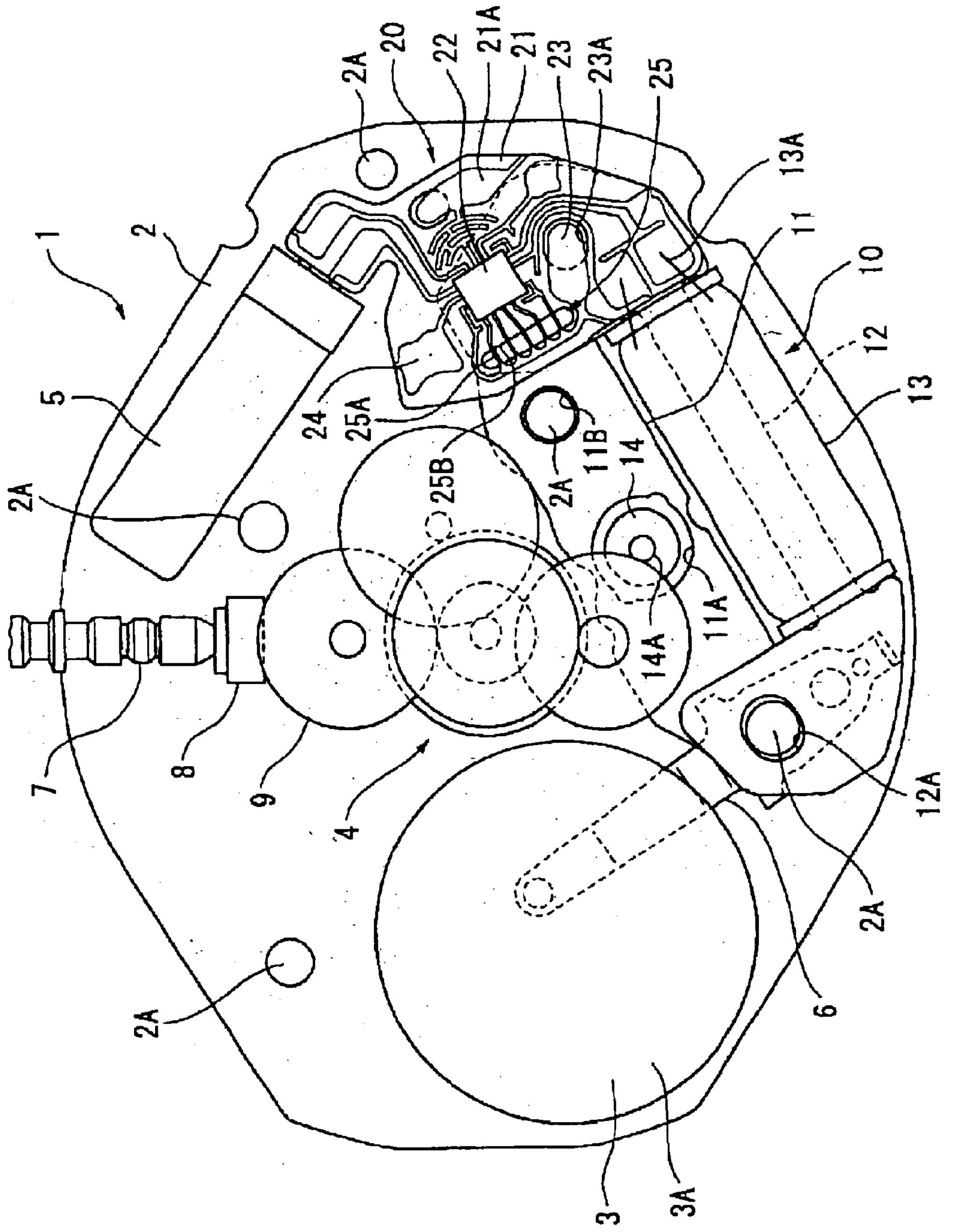
FIG. 1 is a plan view showing a part of a movement of an electronic timepiece according to an embodiment of the present invention.
Figure 2:
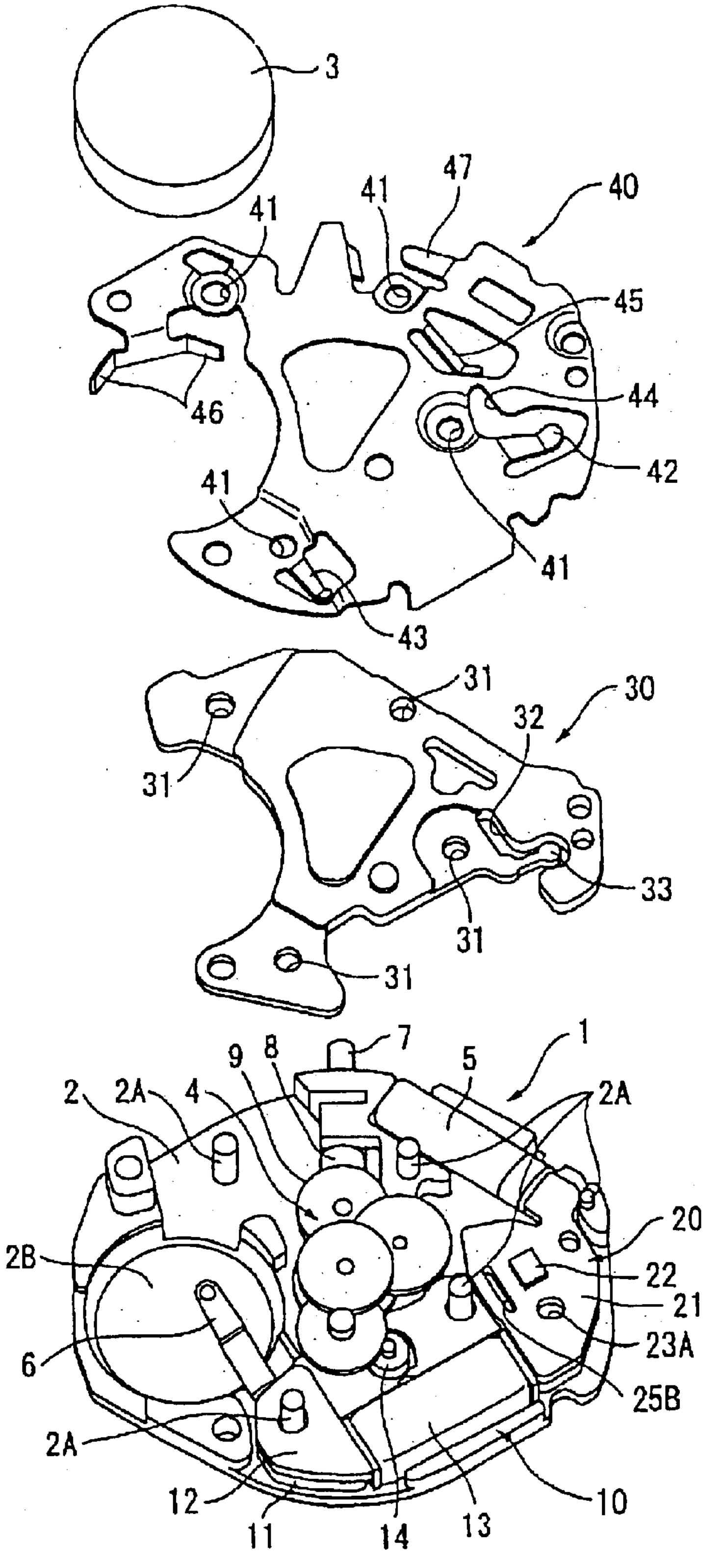
FIG. 2 is an exploded perspective view showing the movement of the embodiment.
Figure 3:
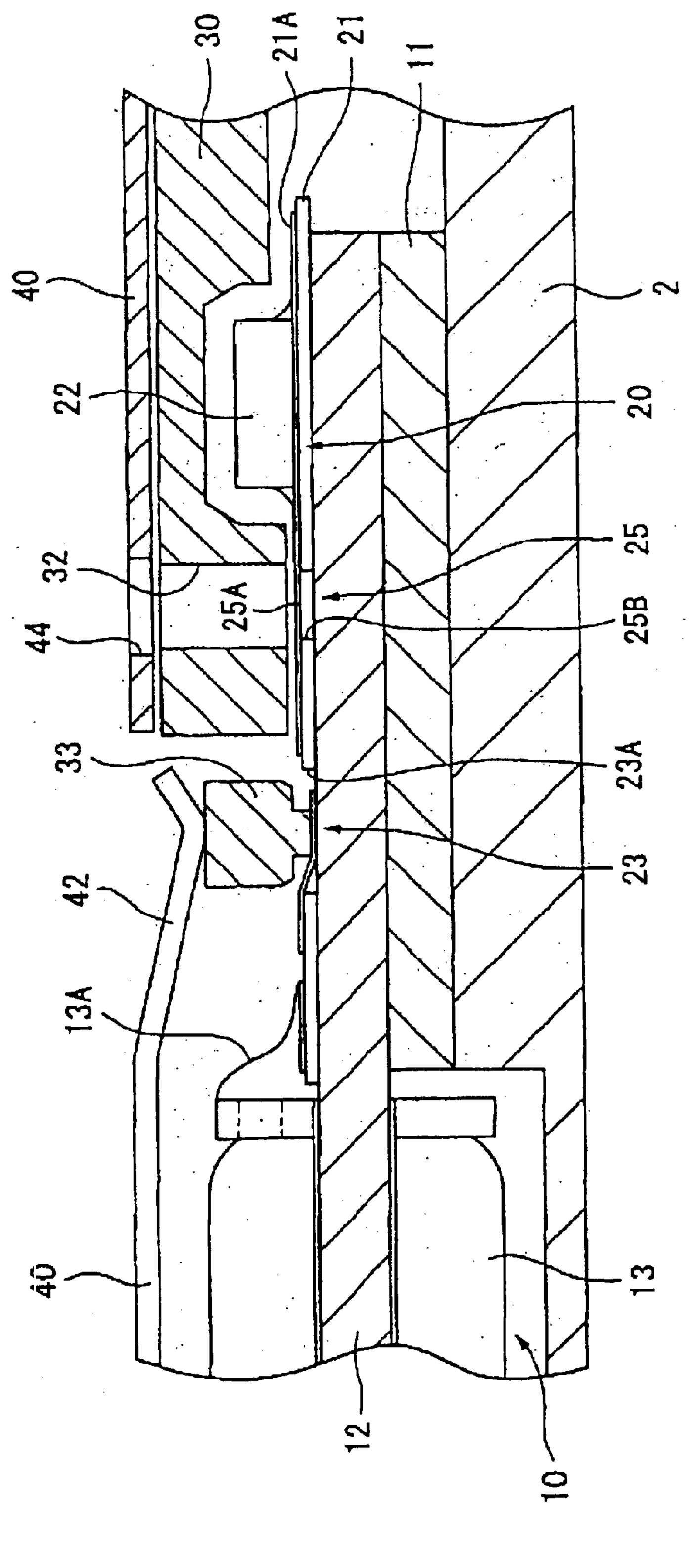
FIG. 3 is a sectional view showing a main portion of the embodiment.
Figure 4:
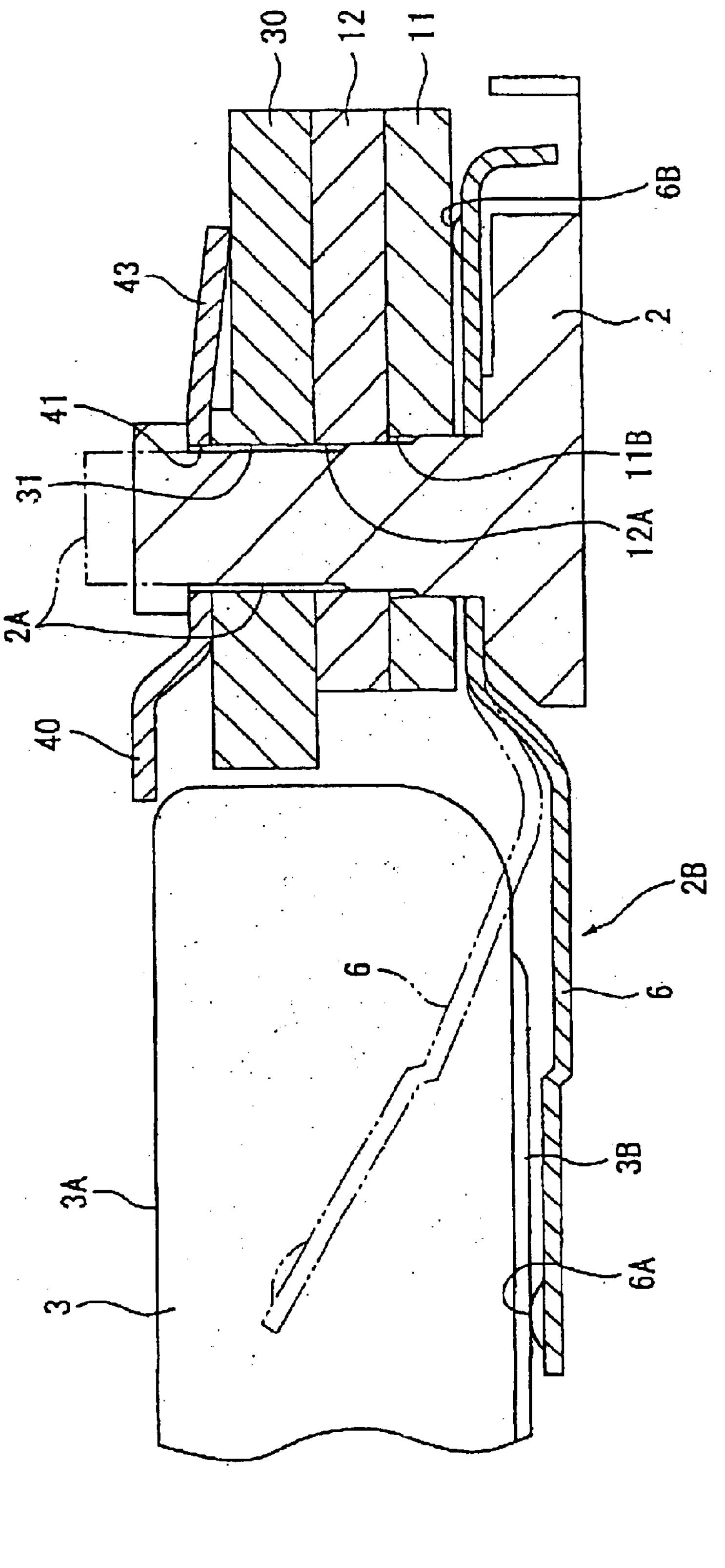
FIG. 4 is a sectional view showing a main portion of the embodiment different from that of FIG. 3.

FIGS. 1 to 4 show a movement 1 (including the principal moving parts) of an electronic timepiece according to an embodiment of the present invention. FIG. 1 is a plan view showing a layout of a stepping motor 10 on a main plate 2, a battery 3, a wheel train 4, and an electronic circuit substrate 20 of the movement 1. FIG. 2 is an exploded perspective view of the movement 1. FIGS. 3 and 4 are sectional views of main portions of the movement 1.

In FIGS. 1 and 2, the movement 1 is arranged such that the stepping motor 10, the electronic circuit substrate 20, the wheel train 4, and the like are positioned on the main plate 2 formed in an approximately elliptical shape and composed of a synthetic resin. A wheel train bridge 30 composed of a synthetic resin is placed thereon. Further, a positive terminal 40, which is stamped from a conductive material such as stainless steel and the like, is attached to the wheel train bridge 30 so as to cover it. A battery installing section 2B is positioned on a left side of the main plate 2 in the figure. An approximately semi-circular cutaway portion is formed in each of the portions of the wheel train bridge 30 and the positive terminal 40 that correspond to the battery installing section 2B. The battery 3, which is a power supply of the stepping motor 10, is installed in the cutaway portions. A positive pole 3A of the battery 3 is conducted to a positive pole presser spring 46 of the positive terminal 40.

While the main plate 2 is formed in an approximately elliptical shape in this embodiment, the shape and size thereof may be determined optionally in the embodiment and is not limited to those of this embodiment. Further, polycarbonate, polyacetal, polypropylene, polyphenylene sulfide and the like are used as the material of the main plate 2. These materials are excellent in mechanical strength, can be colored freely, and further can be formed in a complex three-dimensional shape because they have excellent molding properties.

Coupling pins 2A are positioned on the main plate 2 at five positions in order to position the stepping motor 10, the wheel train bridge 30, and the positive terminal 40 and to secure them by thermal caulking applied thereto from the upper side of the positive terminal 40.

The stepping motor 10 is positioned on a lower right side of the main plate 2 in the figure, the electronic circuit substrate 20 is attached on a side opposite from the battery 3 across the stepping motor 10, and a quartz oscillator 5 is connected above the electronic circuit substrate 20 in the figure. The quartz oscillator 5 is prevented from displacement by being pressed against the main plate 2 thereunder by a quartz oscillator presser spring 47 of the positive terminal 40.

The wheel train 4 composed of a plurality of wheels is positioned between the electronic circuit substrate 20 and the battery 3 at an approximate center of the main plate 2. The lower portion of the wheel train 4 is rotatively supported by the main plate 2 and the upper portion thereof is rotatively supported by the wheel train bridge 30. A time correcting wheel 9 is meshed with the wheel train 4, a sliding pinion 8 is meshed with the time correcting wheel 9 through a winding stem 7 by pulling a winding crown (not shown), and the wheel train 4 is rotated by rotating the crown, thereby time, day of the week, date, etc. can be set.

The stepping motor 10 includes a stator 11, which is composed of a highly magnetic permeable material such as permalloy and the like and is formed in a C-shape when viewed in a plane, a coil magnetic core 12 composed of the same material as that of the stator 11, a motor coil 13 wound around the coil magnetic core 12, and a rotor 14 positioned in a stator hole 11A of the stator 11.

The upper and lower portions of the rotor 14 are rotatively supported by the wheel train bridge 30 and the main plate 2, respectively, and the rotor 14 transmits the drive force of the stepping motor 10 to the wheel train 4 through a rotor pinion 14A thereof.

The stator 11 has a coupling hole 11B drilled therethrough and is positioned and secured to the main plate 2 by passing a coupling pin 2A of the main plate 2 through the coupling hole 11B.

The coil magnetic core 12 is positioned on the stator 11 so as to be superimposed thereon and positioned and secured by inserting a coupling pin 2A through a coupling hole 12A of the coil magnetic core 12. The motor coil 13 is wound around the coil magnetic core 12, and a coil wire 13A of the motor coil 13 is connected to an electronic circuit 21 formed on the electronic circuit substrate 20. Therefore, since the coil of the stepping motor can have many turns in a limited space, power consumption can be reduced by increasing a coil resistance value as well as improving resistance to magnetism from external magnetic fields invading from outside of the timepiece.

The electronic circuit substrate 20 has the electronic circuit 21 formed of a predetermined wiring pattern 21A on a flexible film composed of a synthetic resin such as polyimide, or a flexible film composed of a ceramic such as $Al_2O_3$ and the like, and more than one-half of the surface of the electronic circuit substrate 20 is superimposed on an end portion of the coil magnetic core 12 and secured thereto by bonding and the like. An IC chip 22 acting as an electronic circuit component that forms the electronic circuit 21 is mounted on the electronic circuit substrate 20 at approximately the center thereof, and a negative conductive section 23 is positioned on a lower right side of the IC chip 22 in the figure, with a part of the wiring pattern 21A protruding on a conductive hole 23A drilled through the electronic circuit substrate 20. Further, a positive conductive section 24, which is formed by enlarging another part of the wiring pattern 21A, is positioned on an upper left side of the IC chip 22 in the figure, and the battery 3 is positively conducted to the electronic circuit 21 by causing the positive conductive spring 45 of the positive terminal 40 to come into contact with the positive conductive section 24. Further, a pace accelerating/decelerating unit 25 is positioned on a lower left side of the IC chip 22 in the figure.

Next, in the sectional view of FIG. 3 showing the main portions of the stepping motor 10 and the electronic circuit substrate 20, the IC chip 22 is positioned so as to be superimposed on the end of the coil magnetic core 12. The IC chip 22 is an IC chip for controlling the drive of the stepping motor 10 by creating a reference frequency signal based on a clock signal oscillated by the quartz oscillator 5 and mounted on the electronic circuit substrate 20 with a terminal thereof connected to the electronic circuit 21. The wheel train bridge 30 and the positive terminal 40 are positioned above the IC chip 22 in the figure so as to cover it. It is preferable that the wheel train bridge 30 be provided with a light ray shield function for preventing the transmission of light rays such as a long infrared ray, an infrared ray, ultra violet ray, and visible rays. So as to prevent the transmission of light rays, the wheel train bridge 30 has carbon and absorbs the energy of light rays.

And so as to prevent the transmission of light rays, the wheel train bridge 30 has a mirror surface and reflects the energy of light rays.

The pace accelerating/decelerating unit 25, which has a plurality of (for example, five in the embodiment) line patterns 25A extending from the wiring pattern 21A approximately in parallel with each other across a slot 25B defined through the electronic circuit substrate 20, is positioned on a left side of the IC chip 22 in the figure. Communication holes 32 and 44 are defined through the wheel train bridge 30 and the positive terminal 40, respectively, above the pace accelerating/decelerating unit 25 at positions corresponding to the pace accelerating/decelerating unit 25.

The negative conductive section 23 is positioned on a left side of the pace accelerating/decelerating unit 25 in the figure. A presser section 33 of the wheel train bridge 30 and a presser spring section 42 of the positive terminal 40 are positioned at positions corresponding to the negative conductive section 23. The presser spring section 42 presses the negative conductive section 23 against the coil magnetic core 12 through the presser section 33.

The sectional view of FIG. 4 shows the main portions of the stepping motor 10, which are the stator 11 and the coil magnetic core 12, the battery 3, the wheel train bridge 30, and the positive terminal 40. These are secured on the main plate 2 by inserting coupling pins 2A into the coupling holes 11B and 12A and into coupling holes 31 and 41, and by thermally caulking the heads of the coupling pins 2A. A negative terminal 6 is interposed between the main plate 2 and the stator 11 by inserting a coupling pin 2A thereinto.

The negative terminal 6 is composed of a material having conductivity and a spring property such as phosphor bronze and the like and extends to the vicinity of the center of the battery installing section 2B, and the extreme end of the negative terminal 6 faces upward in a state in which the battery 3 is not installed as shown by a two-dot-and-dash-line in the figure. In a state in which the battery 3 is installed, the negative terminal 6 causes its negative pole projection 6A to come into contact with a negative pole 3B of the battery 3 and causes its projection 6B formed to the side thereof opposite to the battery 3 across a coupling pin 2A to come into contact with the lower surface of the stator 11 as shown by a solid line in the figure, thereby the negative pole 3B of the battery 3 is conducted to the stator 11.

Further, a clamp spring section 43 for pressing the wheel train bridge 30 downward is formed on the positive terminal 40 at the position corresponding to the projection 6B of the negative terminal 6, and the clamp spring section 43 and the projection 6B of the negative terminal 6 clamp the wheel train bridge 30, the stator 11, and the coil magnetic core 12 therebetween.

Next, an assembly procedure of the movement 1 of the embodiment is described below. First, the electronic circuit substrate 20 is bonded to the coil magnetic core 12. Next, the coil wire 13A of the motor coil 13 is wound around the coil magnetic core 12 to which the electronic circuit substrate 20 has been bonded, thereby the assembled coil magnetic core 12 is completed. Next, the quartz oscillator 5 is mounted on the electronic circuit substrate 20. Subsequently, the negative terminal 6, the stator 11 and the assembled coil magnetic core 12 are positioned by being superimposed on the coupling pins 2A of the main plate 2. Subsequently, the rotor 14, the wheel train 4, the time correcting wheel 9, the sliding pinion 8, and the winding stem 7 are sequentially assembled, and the wheel train bridge 30 is attached from above.

Further, in the attachment of the positive terminal 40, it is secured by pressing the presser section 33 of the wheel train bridge 30 by the presser spring section 42, pressing a part of the wheel train bridge 30 by the clamp spring section 43, pressing the quartz oscillator 5 by the quartz oscillator presser spring 47, inserting coupling pins 2A into the coupling holes 41 of the positive terminal 40 while causing the positive conductive spring 45 to be abutted against the positive conductive section 24 of the electronic circuit 21, and thermally caulking the heads of the coupling pins 2A. Note that the coupling pins 2A may be formed separately from the main plate 2. Further, the coupling pins 2A may be secured by any securing means such as securing by screws, and the like, in addition to the thermal caulking.

Further, an adjustment of a hand operating accuracy, which is executed after the movement 1 has been assembled, will be described.

Since the clock signal oscillated by the quartz oscillator 5 varies for each individual quartz oscillator, it must be corrected when the reference frequency signal for driving the stepping motor 10 is created by the IC chip 22. Thus, after the movement 1 has been assembled, the pace accelerating/decelerating unit 25 of the electronic circuit substrate 20 is subjected to a logical acceleration/deceleration adjustment. That is, a laser beam is irradiated to the line patterns 25A of the pace accelerating/decelerating unit 25, which are positioned in parallel with each other, from above the movement 1 through the communication holes 32 and 44 of the positive terminal 40 and the wheel train bridge 30, and the properly selected number of line patterns 25A are cut off. A YAG laser and the like is used as the laser beam. Thus, the logic circuit arrangement of the electronic circuit 21 is changed, thereby the hand operating accuracy of the movement 1 can be precisely adjusted because a corrected reference frequency signal is supplied from the IC chip to the stepping motor 10.

According to the embodiment of the present invention, the following advantages can be obtained.

(1) The relatively large IC chip 22, which is mounted on the electronic circuit substrate 20, is positioned by being superimposed on the end of the coil magnetic core 12 that is composed of metal, has relatively high rigidity, and is unlikely to be deformed, and more than one-half of the surface of the electronic circuit substrate 20 is bonded to the coil magnetic core 12. Thus, in the coil winding process and in the process for assembling the coil magnetic core 12, the electronic circuit substrate 20 can be reliably secured to the coil magnetic core 12, and further the mounted state or condition of the IC chip mounted on the electronic circuit substrate 20 can be maintained in a stable state.

(2) Since the battery 3 and the electronic circuit substrate 20 are positioned separately on the main plate 2 on both sides of the motor coil 13 of the stepping motor 10, one across from the other, the space of the main plate 2 can be effectively used, thereby the size and cost of the movement 1 can be reduced.

(3) Since the IC chip 22 is positioned near the stepping motor 10, electrical resistance is reduced by decreasing a wiring distance, thereby energy loss can be reduced. Further, since the IC chip 22 is positioned near the stepping motor 10, the wiring distance is reduced, thereby the area of the electronic circuit substrate 20 and the area of the pattern can be decreased so as to reduce the manufacturing cost.

(4) Since the pace accelerating/decelerating unit 25 of the electronic circuit substrate 20 is positioned on the relatively thick metal coil magnetic core 12, the laser beam, having cut off the line patterns 25A in the logic acceleration/deceleration adjustment, is shielded by the coil magnetic core 12 and does not impinge on the main plate 2 and other components. Thus, a member for shielding the laser beam need not be separately provided.

Therefore, the manufacturing cost of a timepiece can be reduced by decreasing the number of components.

(5) By employing the method of cutting the line patterns 25A of the pace accelerating/decelerating unit 25 by the laser beam as a method of adjusting the hand operating accuracy, the logical acceleration/deceleration adjustment can be executed more precisely than the method of cutting off them by mechanical punching. Thus, the movement 1 can be miniaturized, and an adjustment process can be promptly executed. Note that in the case of cutting by the mechanical punching, there is a limit in the miniaturization of the electronic circuit substrate 20 because the mechanical strength must be insured to prevent the deformation of the electronic circuit substrate 20. When the laser beam is used, however, the electronic circuit substrate 20 can be easily miniaturized.

(6) The positive terminal 40 permits the positive pole 3A of the battery 3 to be conducted to the positive conductive section 24 of the electronic circuit 21 as well as covering the components such as the wheel train bridge 30 and the like and is supported by and secured to the main plate 2. Thus, the cost can be reduced by decreasing the number of components without the need of other securing members and the like.

(7) The presser spring section 42 provided with the positive terminal 40 presses the negative conductive section 23 of the electronic circuit 21 against the coil magnetic core 12 through the presser section 33 of the wheel train bridge 30. Thus, the electric conduction to the negative conductive section 23 and the magnetic conduction between the coil magnetic core 12 and the stator 11 are reliably effected, thereby the stepping motor 10 can be stably driven without a problem of poor contact and the like.

(8) Since the lower portion of the IC chip 22 is supported by the metal coil magnetic core 12 and the upper portion thereof is covered with the metal positive terminal 40, the IC chip 22 is shielded from electromagnetic noise, static electricity, light, and the like invading from the outside of the electronic timepiece. Thus, the IC chip 22 can stably drive the stepping motor 10 without being influenced thereby.

(9) The projection 6B of the negative terminal 6 presses the stator 11 from below in the state in which the battery 3 is installed so as to increase a contact pressure by point contact, which enables the negative pole 3B of the battery 3 to be reliably conducted to the stator 11.

(10) Since the projection 6B of the negative terminal 6 and the clamp spring section 43 of the positive terminal 40 clamp the stator 11 and the coil magnetic core 12 therebetween, the stator 11 can be made to come into close contact with the coil magnetic core 12. Thus, the negative conduction to the coil magnetic core 12 and the magnetic conduction between the coil magnetic core 12 and the stator 11 can be reliably effected.

(11) The negative pole 3B of the battery 3 is electrically conducted to the negative conductive section 23 of the electronic circuit 21 through the negative terminal 6, the stator 11, and the coil magnetic core 12. Thus, the negative terminal 6 need not be extended up to the electronic circuit substrate 20, thereby reducing the cost because the number of components can be reduced as well as the size thereof can be miniaturized.

(12) Since the IC chip 22 is covered with the wheel train bridge 30, which functions to prevent the transmission of light rays, it is possible to also prevent transmission of heat rays to the IC chip 22, which cause the silicon IC chip 22 to generate electromotive force by a photoelectric effect. Thus, the malfunction of the timepiece can be prevented by suppressing increased electric current to the IC chip 22. And further, the consumption of energy of the battery is decreased.

(13) A double press structure is employed in which the presser section 33 presses the negative conductive section 23 of the electronic circuit 21 against the coil magnetic core 12 and further the presser spring section 42 presses the negative conductive section 23 against the coil magnetic core 12 through the presser section 33. Thus, the negative conductive section 23 can be more reliably pressed even if the thermally caulked portions of the coupling pins 2A are contracted and somewhat loosened by being cooled after they have been thermally caulked, thereby the reliability of the electric conduction from the negative pole 3B of the battery 3 to the electronic circuit 21 can be improved.

Note that while the best arrangement, method, and the like for embodying the present invention have been disclosed above, the present invention is not limited thereto.

That is, while the present invention is particularly illustrated and described mainly as to the specific embodiment, persons skilled in the art can variously modify the detailed arrangements of the embodiment described above such as a shape, material, quantity, and the like without departing from the scope of the spirit and object of the present invention.

In the embodiment described above, the main plate 2 and the wheel train bridge 30 are composed of the synthetic resin. However, the present invention is not limited thereto, and any electrically insulating material (e.g. ceramic) may be applied, and further a metal material and the like covered with an insulation layer may be also applied.

Further, stainless steel and the like are used in the positive terminal 40 and phosphor bronze and the like are used in the negative terminal 6. However, stainless steel may be used in both the positive terminal 40 and the negative terminal 6, and phosphor bronze, aluminum alloys, stainless steel having gold plated on the surfaces thereof may be also used. Further, materials other than the above may be applied as long as they have a similar performance, and, for example, a synthetic resin material to which electric conductive plating is applied may be used. A primary battery, which makes use of a chemical reaction and can be discharged only and cannot be charged, a silver oxide battery, a lithium battery, a secondary battery and a capacitor that make use of a chemical reaction and can be charged and discharged repeatedly, or a battery containing an electromagnetic power generation mechanism can be employed as the power supply.

Further, in the embodiment described above, the negative conduction from the negative pole 3B of the battery 3 to the electronic circuit 21 is executed through the coil magnetic core 12 and the coil magnetic core 12 is charged with a negative potential. However, the present invention is not limited thereto, and even an arrangement in which the positive pole 3A of the battery 3 is conducted to the coil magnetic core 12 so that the coil magnetic core 12 is charged with a positive potential is included in the present invention.

Note that the main plate may also act as a rear cover as a timepiece exterior component. Further, the main plate may be arranged as a one-piece type in which a case as a timepiece exterior component is integrated with a rear cover. When the main plate also acts as another component, the thickness of the movement can be reduced by the thickness of the main plate, thereby a timepiece having a thin type design can be produced.

As described above, according to the electronic timepiece of the present invention, the relatively large electronic circuit component mounted on the electronic circuit substrate formed of the synthetic resin film and the like are positioned by being superimposed on the metal coil magnetic core that has the relatively high rigidity and is unlike to be deformed. Accordingly, there is achieved an advantage that the electronic circuit substrate can be reliably attached to the coil magnetic core and the mounted portion of the electronic circuit component mounted on the electronic circuit substrate can be maintained in a stable state.

What is claimed is:

1. An electronic timepiece comprising:

a main plate composed of an electric insulating material;

a stepping motor having a stator, a coil magnetic core, a motor coil, and a rotor;

a power supply;

a wheel train driven by the stepping motor;

a wheel train bridge that supports the wheel train;

a quartz oscillator that outputs a clock signal;

an electronic circuit substrate; and an electronic circuit component that controls the rotation cycle of the stepping motor based on the clock signal, the electronic circuit component being mounted on the electronic circuit substrate in a position superimposed on the coil magnetic core in a plane.

2. An electronic timepiece according to claim 1, further comprising a pace accelerating/decelerating unit that adjusts a pace accuracy of the timepiece, the pace accelerating/decelerating unit being mounted on the electronic circuit substrate in a position superimposed on the coil magnetic core in a plane.

3. An electronic timepiece according to claim 1 further comprising a positive terminal that electrically conducts a positive pole of the power supply to an electrical circuit of the electronic circuit substrate, and a negative terminal in contact with a negative pole of the power supply, the negative pole of the power supply being electrically conducted to the electronic circuit through the negative terminal and the coil magnetic core.

4. An electronic timepiece according to claim 3, wherein the electronic circuit comprises a negative conductive section conducted to the coil magnetic core, and a presser member that presses the negative conductive section against the coil magnetic core.

5. An electronic timepiece according to claim 4, wherein the presser member is formed as a presser section of the wheel train bridge.

6. An electronic timepiece according to claim 4, further comprising a spring member that presses the negative conductive section against the coil magnetic core through the presser member.

7. An electronic timepiece according to claim 6, wherein the spring member is formed as a presser spring section of the positive terminal, and the presser member is electrically insulating.

8. An electronic timepiece according to claim 3, further comprising a clamp member, and the stator and the coil magnetic core are superimposed on each other and are clamped between the negative terminal and the clamp member, the negative terminal pressing and coming into contact with one of the stator and the coil magnetic core from a first direction, and the clamp member pressing and holding the other of the stator and the coil magnetic core from a second direction opposite from the first direction.

9. An electronic timepiece according to claim 8, further comprising a projection projecting toward one of the stator and the coil magnetic core at a position where the negative terminal presses one of the stator and the coil magnetic core.

10. An electronic timepiece according to claim 8, wherein the clamp member is formed as a clamp spring section of the positive terminal, and further comprising an electrically insulating insulation member interposed between the clamp spring section and the coil magnetic core.

11. An electronic timepiece according to claim 10, wherein the insulation member forms a part of the wheel train bridge, which is composed of a synthetic resin.

12. An electronic timepiece according to claim 1, further comprising a metal member that covers the electronic circuit component on the side thereof opposite to the coil magnetic core.

13. An electronic timepiece according to claim 12, wherein the metal member is a positive terminal that electrically conducts a positive pole of the power supply to the electronic circuit of the electronic circuit substrate.

* * * * *